US006975178B1

(12) United States Patent
Kessler et al.

(10) Patent No.: US 6,975,178 B1
(45) Date of Patent: Dec. 13, 2005

(54) MILITARY COMMUNICATIONS ANTENNA SWITCHING

(75) Inventors: Donald J. Kessler, Beavercreek, OH (US); David N. Coates, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 345 days.

(21) Appl. No.: 10/608,114

(22) Filed: Jun. 25, 2003

Related U.S. Application Data

(60) Provisional application No. 60/453,394, filed on Mar. 10, 2003.

(51) Int. Cl.⁷ ............................ H01P 1/10; H01Q 1/24; H04B 1/44

(52) U.S. Cl. ...................... 333/105; 333/262; 343/906; 455/78; 455/90.1

(58) Field of Search ................................ 333/105, 262; 343/906; 455/78, 90.1, 90.3

(56) References Cited

U.S. PATENT DOCUMENTS

| | | | | |
|---|---|---|---|---|
| 2,509,928 A | | 5/1950 | Klein | |
| 3,010,080 A | | 11/1961 | Concelman | |
| 3,666,902 A | | 5/1972 | Owen et al. | |
| 3,873,794 A | | 3/1975 | Owen | |
| 4,216,362 A | | 8/1980 | Simon | |
| 4,286,335 A | * | 8/1981 | Eichler et al. | 455/90.3 |
| 5,936,581 A | * | 8/1999 | Roshitsh et al. | 343/702 |

* cited by examiner

*Primary Examiner*—Dean Takaoka
(74) *Attorney, Agent, or Firm*—AFMCLO/JAZ; Gerald B. Hollins

(57) ABSTRACT

A military special operations forces communications assisting, ruggedized, manually operated coaxial antenna A/B switch especially suited for mounting directly on the input/output port connector of a wide band transceiver radio apparatus or for alternate use as a tether-connected switch. The switch includes multi-switch stacking capability, weather and rough usage adaptability, detented operation, accidental position change protection, gloved hand operation and desirable electrical characteristics. Use of the switch in single or multi switch arrangements under darkened and time-limited battlefield conditions to change between differing antennas used with a military mission transceiver radio transceiver is possible.

24 Claims, 5 Drawing Sheets

MILITARY COMMUNICATIONS ANTENNA SWITCHING

CLAIM OF PRIORITY

This application claims the benefit of U.S. Provisional Application No. 60/453,394, filed Mar. 10, 2003. The contents of this provisional application are hereby incorporated by reference herein.

The invention described herein may be manufactured and used by or for the Government of the United States for all governmental purposes without the payment of any royalty.

BACKGROUND OF THE INVENTION

Military battlefield apparatus is desirably provided with what may be considered a finely tuned combination of reliability, physical damage immunity and operating ease. The United States Armed Forces have for example maintained since at least an early part of the twentieth century a set of standards intended to bring as many of these characteristics as possible into each new piece of hardware placed in their inventory. These MIL standards often state specific physical and characteristics requirements to be met by common items entering the U.S. military supply system. Common examples bearing the influence of such standards include the clothing, the vehicles and the weaponry used by the U.S. Military.

Notwithstanding the influence of these MIL standards and commendable early planning for most new military apparatus it is often found desirable as a result of cost considerations and the desirable performance of an existing piece of military equipment for examples to accomplish modifications of existing equipment in order to meet new needs or to take advantage of new technology or to otherwise improve its performance beyond that envisioned by the early planners. The well-known B-52 bomber aircraft is a notable large equipment example of such upgrading and continued usage. When this aircraft was first conceived in the 1940's and 1950's such things as global position systems, satellite communications and even integrated circuit electronics were hardly a thought in anyone's mind yet the retrofitting such technologies into older equipment including the B-52 has become commonplace and provides valuable systems for present day uses. The present invention is concerned with another of these retrofitting sequences involving a less spectacular but nevertheless essential piece of military hardware i.e., the communications equipment used by certain arms of several of the U.S. military services.

To be more specific, in the world of special operations forces there can arise a need for persons operating in secrecy and perhaps behind enemy lines to communicate under a number of unfavorable conditions with a plurality of different persons. These communications may extend in distance for example from the crew of a nearby aircraft to a distant command center or to special operations companions located significant distances away. A portion of such communications may for example involve satellites and high gain highly directive antennas while other portions may involve more simple local area antennas having omni directional field patterns. Since such communications are often needed under conditions of utmost secrecy, in darkness or otherwise obstructed visibility, with significant second party flexibility and under conditions of great haste the ability to switch antennas used for such communications with minimum lost communication time can be important. The need for haste can be appreciated for example by considering a scenario wherein last second events require the abortion or redirection of an embarked-upon air strike mission. The antennas used for these several communications tasks may be differently configured in that they have differing directional orientations, different electrical field patterns, different mounting arrangements, different physical size and shape, differing operating frequencies, and so-on.

By way of special interest, a version of the present invention including the transceiver radio set, the monopole and beam antennas and the antenna switch element is said to have appeared in the Fox news channel coverage of the 2003 Coalition Forces movement toward Baghdad, Iraq. Deployment of the invention to the battlefield has in fact received high priority in the U.S. Department of Defense.

SUMMARY OF THE INVENTION

The present invention provides an enhanced communications capability for military personnel especially including special operations forces personnel.

It is therefore an object of the invention to provide a quick and convenient arrangement for selecting between a plurality of antennas usable with a series of battery operated tactical combat portable transceiver radio sets employed by the U.S. military.

It is an object of the invention to provide radio communications antenna-switching capability usable under extreme ambient conditions.

It is an object of the invention to provide radio communications antenna-switching capability usable under multiple combinations of darkness, clandestine operation, operating speed urgency, inclement weather and protective clothing (for weather and enemy chemical attack protection) usage by an operator.

It is another object of the invention to provide antenna-switching capability usable by deployed special operations military personnel.

It is another object of the invention to provide antenna-switching capability permitting rapid election between selected radio communications antennas.

It is another object of the invention to provide externally disposed antenna-switching capability in a form that may be mounted directly on the antenna connection port of a radio apparatus.

It is another object of the invention to provide a discrete antenna-switching device having the flexibility to be used in tandem mounted plurality or in unitary form.

It is another object of the invention to provide an externally received antenna-switching capability that may be achieved in a convenient and low cost form.

It is another object of the invention to provide a radio communications antenna-switching capability that may be fabricated according to a plurality of fabrication procedures.

These and other objects of the invention will become apparent as the description of the representative embodiments proceeds.

These and other objects of the invention are achieved by military special operations forces portable voice communications apparatus comprising the combination of:

- a portable battery operated special operations forces radio frequency-tunable high frequency and ultra high frequency voice communications radio transceiver having a single antenna electrical energy communications port coaxial fitting;
- a monopole first radio antenna member having a substantially uniform circular electromagnetic field pattern, local geographic area ground to ground and ground to air communications capability and a coaxial electrical energy communication port;

a collapsible multi element plus back plane reflector second radio antenna member having a major lobe unidirectional electromagnetic field pattern, ground to orbiting satellite communications capability and a coaxial cable electrical energy communicating second tether member; and a manually operable, environmentally sealed, metal housing enclosed, coaxial single pole double throw electrical switch member physically receivable on said radio transceiver single antenna electrical energy communications port coaxial fitting and having a special operations forces personnel gloved hand compatible, detented, push pull switch position-changing manual input, said electrical switch member having first and second electrical energy communicating coaxial ports connectable with said first radio antenna member and said second radio antenna member respectively;

said electrical switch connection with said first radio antenna member being by way of a selectable one of a direct engagement between said first antenna member coaxial electrical energy communication port with said electrical switch first electrical energy communicating port and a coaxial cable electrical energy communication first tether member coupling of said first antenna member coaxial electrical energy communication port with said electrical switch first electrical energy communicating port;

said electrical switch connection with said second radio antenna member being by way of said coaxial cable electrical energy communication second tether member coupling of said second antenna member coaxial electrical energy communication port with said electrical switch second electrical energy communicating port;

said manually operable, environmentally sealed, metal housing enclosed, coaxial single pole double throw electrical switch member enabling rapid, minimal transceiver communications interrupted, first antenna and second antenna transition-inclusive communications between said special operations forces personnel and both local and orbiting satellite-accessed distant personnel.

BRIEF DESCRIPTION OF THE DRAWING

The accompanying drawings incorporated in and forming a part of the specification, illustrate several aspects of the present invention and together with the description serve to explain the principles of the invention. In the drawings.

DETAILED DESCRIPTION OF THE INVENTION

Figure 1:
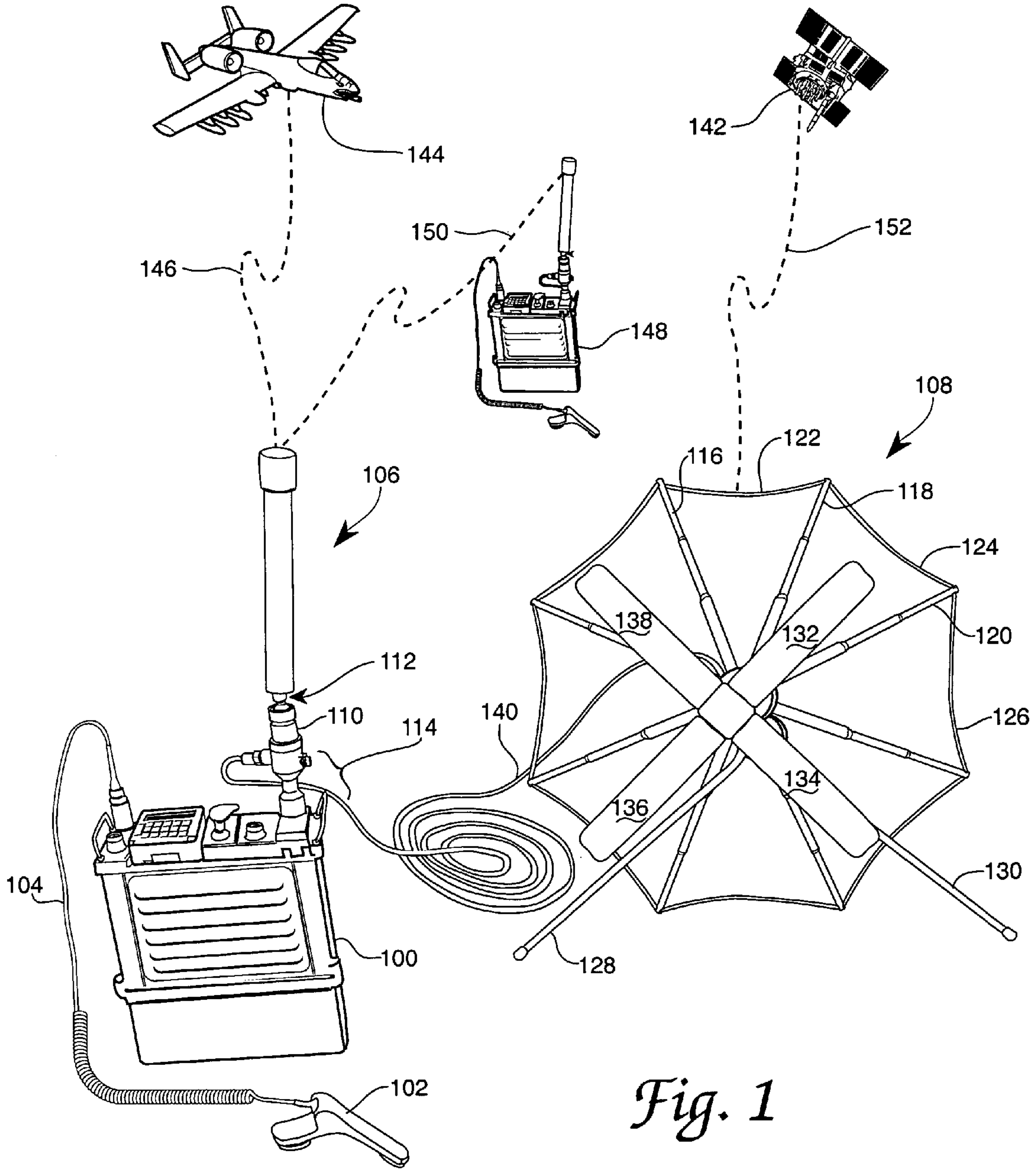
FIG. 1 shows a transceiver radio set and antennas combination in which the present invention can be employed.

In order to better appreciate the ensuing description of the present invention it may be helpful to understand that the battery energized high frequency to ultra high frequency tactical radios used by the U.S. military generally can now be used in what may be described as two different modes of operation. One of these operating modes often employs an omni-directional and generally line-of-site (LOS) communication-limited low-gain monopole antenna in order to communicate in any direction in for example local ground-to-ground and ground-to-air situations. The second operating mode uses a high-gain beam type antenna to communicate with and through an orbiting satellite (i.e., a SATCOM antenna). Since neither the government employees drafting the technical specifications resulting in the high frequency to ultra high frequency radios nor the manufacturer of the radios could reasonably foresee that later radio users would require the capability to rapidly switch back and forth between these two different operating modes and two different antennas the resulting radio was provided with a single antenna port that must now be time shared between these two modes and between two antennas.

One of the major difficulties with this time-sharing, mode changing, arrangement occurs when special operations ground forces for example are directing air strikes, often from clandestinely-achieved positions located behind enemy lines. Such special operations forces personnel often must coordinate their activities with command units by way of a satellite or SATCOM antenna while concurrently directing airborne strike activities through a line of sight or LOS antenna. The special operations forces radio operator is thus burdened with the tedious task of repeatedly switching between LOS and SATCOM antennas while also being occupied with mission related and personal safety related activities. Without divulging specific instances, in recent overseas operations, this cumbersome antenna change procedure has proven to be quite dangerous. In some instances, ground troops while under fire, have struggled to appropriately switch antennas in order to call for airborne or other assistance. In such situations the delay and additional confusion caused by antenna switching tasks could have disastrous results.

In another instance of this general type, special operations ground forces often need to abort an air strike at the last possible moment because of a change in target conditions or because of the occurrence of a higher priority target in a nearby but different location for examples. The present invention significantly reduces the problems identified with the task of switching between antennas. With the invention the task of transferring between two antennas can be accomplished by a simple switch actuation. The present invention also allows ground forces or other users to set up both needed antennas remotely with extended coupling via coaxial cables. The antennas may thus be placed outside a protective shelter, while the radio and operator remain safely under weather or camouflage or munitions-immune protective cover. Another capability gained through use of the invention is that a user no longer needs to remove the radio, which is often transported by backpack, from his back in order to switch antennas. This not only improves user mobility, but also because switching between antennas now requires almost-no movement, the present invention diminishes the chances of special operations forces being seen or heard by nearby enemy personnel.

FIG. 1 in the drawings therefore shows a general view of the antenna switch device of the present invention along with several attending elements as this total apparatus may be employed for communications purposes by special operations forces or other military personnel. In the FIG. 1 drawing a portable tactical transceiver radio of the type represented by the PRC 117 series radio set manufactured by Harris Corporation of Melbourne Fla. is shown at 100. Radios of this general type are also supplied by Raytheon Company of Lexington, Mass., under the identity of a PCS 5 radio set. Other suppliers of such radios are also possible; indeed the present invention is not limited to any one of these radio sets, nor to any particular radio set. The invention may for example find use in law enforcement, border patrol, park ranger and numerous other radio communication scenes, scenes involving other communications equipment. For language convenience purposes it is however convenient to refer to these numerous use possibilities by naming a particular radio set; the PRC 117 radio is therefore adopted herein for this purpose. This adoption is intended to be without limitation of the invention.

Connected to the transceiver radio set 100 in FIG. 1 is a tether 104-coupled handset 102 containing both a microphone and an earpiece or receiver for use by a person employing the transceiver 100 for two way tactical voice communications, communications often accomplished by way of the UHF band of radio operating frequencies. When operated in this UHF band of frequencies the transceiver 100 is generally considered to provide useful communication over a line-of-sight distance of several miles over the earth's surface or some greater distance when communicating into space as may for example involve an earth satellite. Such satellite communications may be desirable to permit communication over longer distances, possibly by relaying, using the tactical transceiver 100.

The FIG. 1 drawing also shows representations of the two different types of antennas 106 and 108 that may be used with the transceiver 100 for these line-of-sight and the longer satellite-involved communications. The antenna 106 may be described as an end fed, end loaded, vertical monopole antenna, an antenna having a generally circular omnidirectional pattern of electrical field strength. An antenna of this type is desirable for point-to-point line-of-sight communication over small portions of the earth's surface or to a local aircraft when used with a relatively low power transceiver such as the PRC 117 type of radio. The antenna 106 is shown in FIG. 1 to include a base and connector portion 110 and a ball and socket flexible coupling joint 112 and is mounted directly on the transceiver 100 as might be convenient for back pack or other portable usage. The ball and socket flexible coupling joint 112 permits an orientation of the antenna 106 that is independent of physical orientation of the radio 100 as may be desirable for example in backpack or resting on sloping terrain situations.

The antenna 108 in FIG. 1 may be described as a portable collapsible ground supported four element reflector-aided unidirectional antenna that is especially useful for communicating via satellite with the transceiver 100; this antenna may also be identified as a SATCOM antenna in view of its special adaptation to satellite communication. The antenna 108 is shown in FIG. 1 to include the four active elements 132, 134, 136 and 138 that are fed in electrically phased relationship (for signal polarization purposes) by way of the tethering coaxial cable 140. The antenna 108 includes the foldable reflecting back plane elements 116, 118, 120 and so on that are connected together physically and electrically by the encircling endpoint conductors 122, 124 and 126. The antenna 108 provides an a-symmetrical lobed directional electrical field pattern extending primarily toward the viewer in the FIG. 1 drawing; this field pattern provides a gain improvement of about fourteen decibels with respect to a monopole antenna such as the antenna 106 but of course requires physical orientation with respect to the distant satellite station.

The antenna 108 is made to be collapsible in nature and is supported by a trio of legs, two of which are shown at 128 and 130 in the FIG. 1 drawing. Both the antenna 108 and the antenna 106 are electrically bi-lateral in nature i.e., they may each be used for signal transmitting and signal receiving purposes. Some language in the present document may be interpreted as relating primarily to the transmitting or the receiving of these two functions of a transceiver radio set. Language relating to signal directions to or from an antenna element is an example of such usage. Notwithstanding such possible interpretation it is desired that the invention be understood to be fully bi-lateral in nature.

At 114 in the FIG. 1 drawing there is shown a coupling element electrical switch device, i.e., a switch, by which each of the antennas 106 and 108 may be individually connected electrically with the transceiver 100 for both signal transmission and signal reception purposes. The switch 114 is a focus point of the present invention and is shown in greater detail in the FIG. 2, FIG. 3 and other drawings herein. A representation of an A-10 tactical aircraft with which the radio transceiver 100 may enable communication appears at 144 in the FIG. 1 drawing; a representative orbiting satellite appears at 142 in FIG. 1. Communication paths with these distant stations are represented at 146 and 152 in the FIG. 1 drawing; communication with a distant ground-based station 148 also using antenna 106 is represented at 150 in FIG. 1. The switch 114 thus provides a multiple antenna improvement in the capability of the transceiver 100, an improvement made especially desirable by the more recent advent of satellite based communication from the military battlefield.

Figure 2:
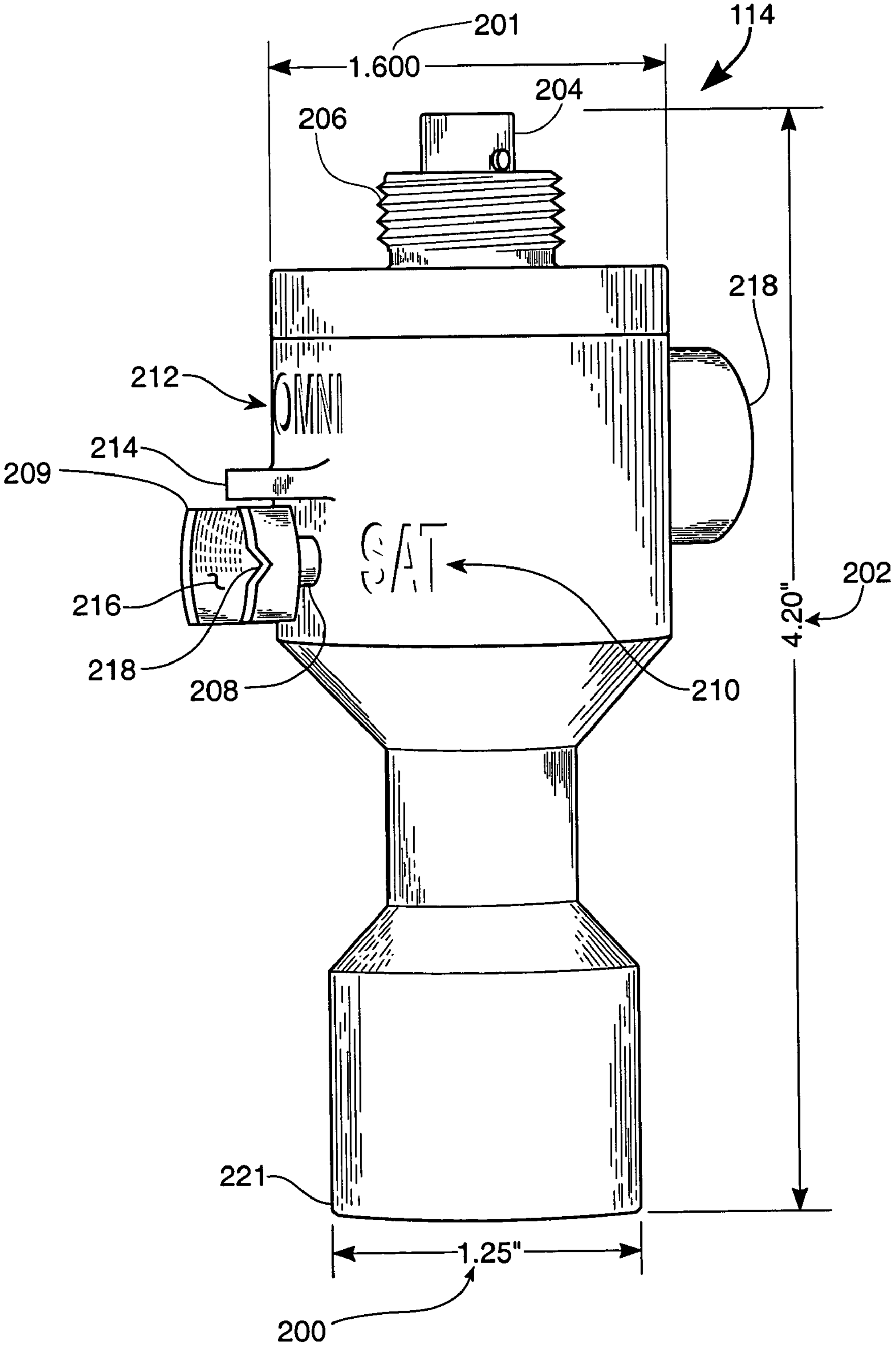
FIG. 2 shows an overall exterior view of an antenna-switching device in accordance with the present invention.

In the FIG. 2 drawing there is shown an enlarged, greater than full-sized, external view of a preferred arrangement of the switch 114 appearing in the FIG. 1 drawing. Actual overall diameter and length dimensions for the switch 114 appear at 200, 201 and 202 in the FIG. 2 drawing. Also visible in FIG. 2 are several specific details of the preferred arrangement of the switch 114, details including one output signal coaxial connector 204 and its surrounding threaded receptacle 206 and the surrounding receptacle 218 of a second output signal connector. The input coaxial connector does not appear in the FIG. 2 drawing but resides within the bell shaped receptacle or housing 221. Each of these coaxial connectors is preferably embodied as a commercially available BNC series connector. At 210 and 212 in FIG. 2 there also appears the body markings or switch position indicators or labels "SAT" (Satellite Antenna) and "OMNI" (Omni-Directional Antenna) which may be recessed into or protrude from the exterior surface of the switch 114 housing in order to provide indication of which of the respective FIG. 1 antennas 108 and 106 is presently connected with the transceiver 100. Preferably the labels 210 and 212 are made to be of such size and relief dimensions as to be discernable by human operator touch under darkness and less than clean conditions.

Additionally appearing in the FIG. 2 drawing is an actuator rod assembly 208 usable to change the internal electrical circuit or switch position selected for the switch 114. This actuator rod terminates externally in an integral head 209 by which the rotational positioning of the actuator rod is changed and its rotational position is made known to a human operator. The head 209 is shown to include a thumb recess region 216 and a switch position-indicating notch 218, a notch cooperating with the labels 210 and 212. Preferably the position indicator notch 218 is also made to be of such size and relief dimensions as to be position-discernable by human operator touch under darkness and less than clean conditions. A combination rotational stop or protrusion and physical protection for head 209 appears at 214 and is contemplated to be an integral part of the switch housing. The head 209 is arranged to make the switch 114 amenable to operation by the glove-covered hand of a person wearing clothing protective against either hostile weather or hostile atmospheric conditions, conditions inclusive of for example chemical and biological warfare agents. For language convenience purposes, the FIG. 2 switch 114 i.e., the switch of the present invention, may be referred to as being of "fist size" or of "table salt shaker size" even though each of these descriptions may involve somewhat unusual examples to meet the dimensions shown in FIG. 2.

Figure 3:
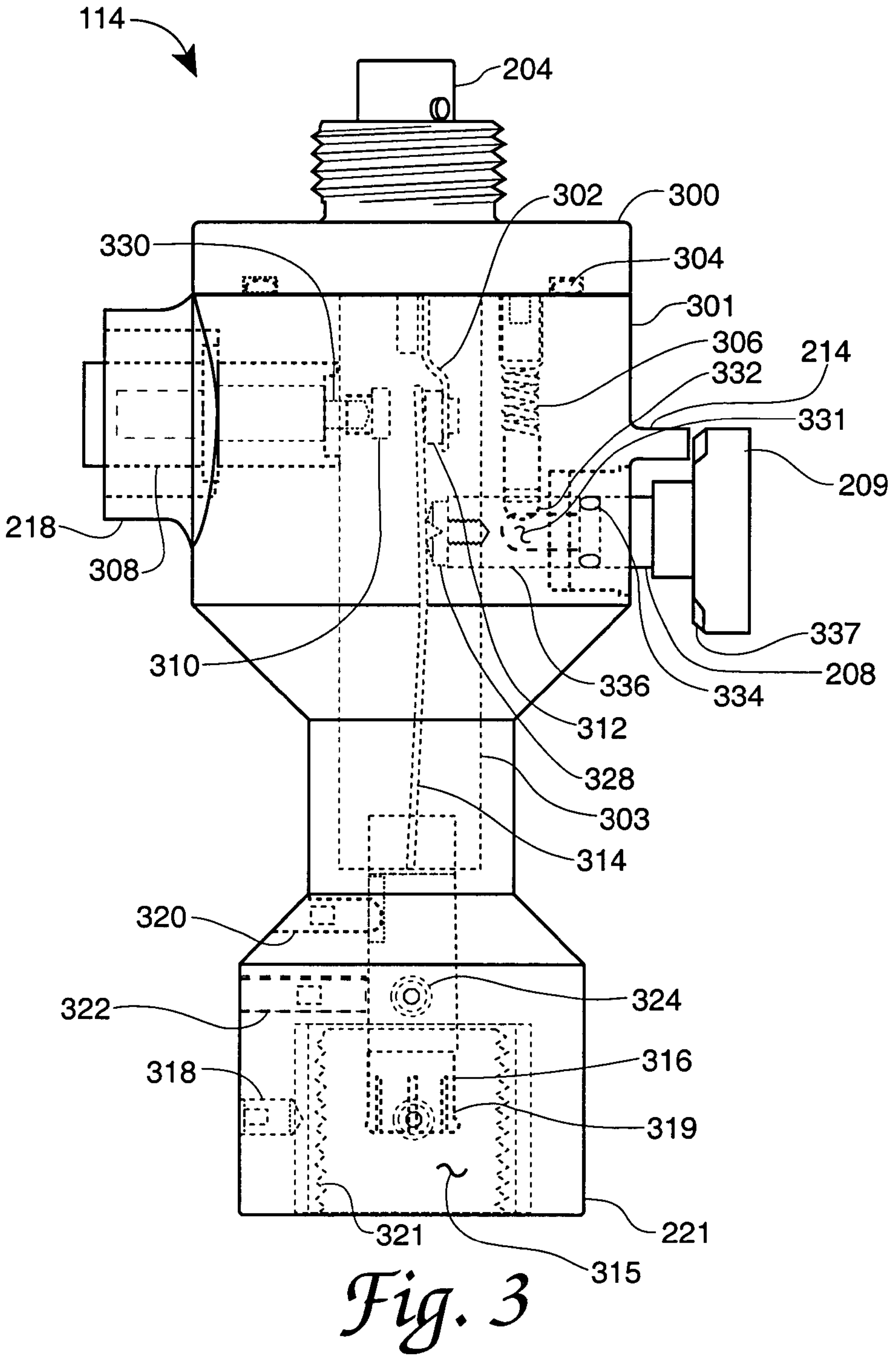
FIG. 3 shows a view of the FIG. 2 antenna-switching device in which internal parts are visible.

FIG. 3 in the drawings shows additional details of the switch 114 appearing in the FIG. 1 and FIG. 2 drawings, details inclusive of internal portions of the switch and its structure. The FIG. 3 details represent applicants' preferred arrangement of the switch 114 but of course are but one of numerous possible ways that an electrically equivalent switch of the types known as a single pole double throw, or SPDT, or form C contact, or A/B switching configurations can be fabricated within the scope of the present invention. Internal portions of the FIG. 3 switch 114 are shown in dotted line form in view of their being hidden and internal in the normal condition of the switch. The identification numbers used in the FIG. 3 drawing are the same as those used in the FIG. 1 and FIG. 2 drawing, i.e., the same element bears the same identification in all views to the best degree possible. For these reasons new numbers in the 300 series are assigned as needed to identify parts of the switch first appearing in FIG. 3 and later drawings of the present document include numbers in the 100 through 400 series.

Figure 4A:
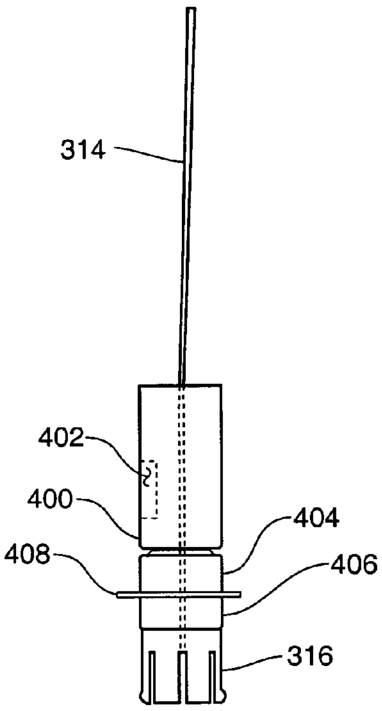
FIG. 4*a* shows an isolated detail view of one sub-assembly used in the present invention.
Figure 4E:
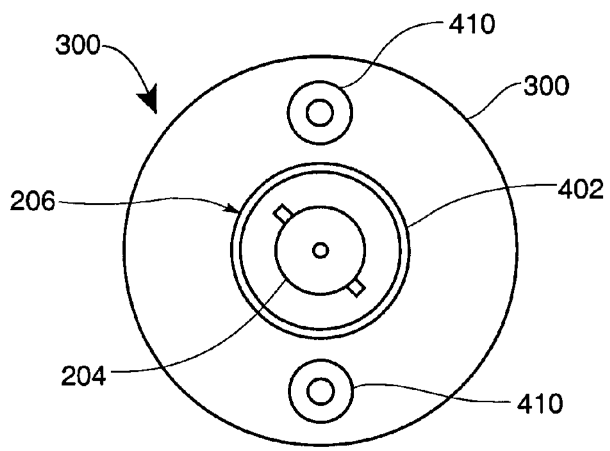
FIG. 4*e* shows a top view of a FIG. 3 cap assembly.

In the FIG. 3 drawing therefore the switch 114 is shown to be contained in a metallic housing 301 having an internal cavity 303 in which are received a number of component electromechanical parts and their associated sub assemblies. The housing 301 and cavity 303 are sealed into a weather-immune integral package by a cap assembly 300 that is inclusive of an elastic "O" ring 304 located in a circular recess. The cap assembly 300 is held in its cavity closing position by a recessed pair of for example Allen head cap screws located in externally accessed recesses disposed around the top surface of the cap assembly 300 as are represented at 410 in the FIG. **4*b* drawing and in the FIG. 4*e* drawing, a top view of cap assembly 300. Interior details of the bell shaped receptacle or housing 221 and the included input coaxial connector 316 also appear in the FIG. 3 drawing. The switch elements-containing cavity 303 in the housing 301 preferably has a diameter near 0.5 inch; adjustments of this diameter may be used to control the preferably fifty ohm characteristic impedance of the switch 114. Such matching of the characteristic impedances of the output coaxial cable and the radio transceiver provide desirable maximum power transfer and minimum transmission line standing wave ratio characteristics for the switch 114 and its associated components. Operation of the switch 114** in at least the frequency range of high frequency to ultra high frequency, as is the capability of the PRC 117 series radios, is possible.

The output coaxial connector described in connection with the FIG. 1 drawing again appears at 204 in the FIG. 3 drawing, a second output coaxial connector appears at 308 in the FIG. 3 drawing and an input coaxial connector 316 appears in its threaded recess cavity 315. The internal threads of cavity 315 are indicated at 321 in the FIG. 3 drawing and the unthreaded cavity structure containing output coaxial connector 308 again appears at 218 in FIG. 3. The cavity 218 does not require threading because it is not usually involved in the possible threaded physical stacking of present invention switch elements and is thus contemplated to always receive an antenna-feeding flexible coaxial cable. The input coaxial connector 316 is contemplated to be of the commercial BNC type and is compatible with the connectors 204 and 308; electrical contact-assuring springs of this connector 316 appear at 319 in FIG. 3. Each of the coaxial connectors 204, 308 and 316 in the FIG. 3 drawing actually comprises one portion of a sub assembly employed in fabricating the switch 114 as is described in greater detail below herein.

The coaxial connector 308 in FIG. 3 has attached to its output central conductor an electrical contact member 310 in order to bi-directionally communicate electrical energy with the input coaxial connector 316 when a reed 314 portion of an input coaxial connector 316 assembly is disposed in one of its possible positions. The electrical contact member 310 is preferably attached to the center conductor 330 of the coaxial connector 308 assembly by silver alloy tin-lead solder; similar soldering is in fact preferably used to attach each of the contacts and contact assemblies located in the cavity 303. In the second position of reed 314 the head of a nylon screw 328 located in the end of actuator rod assembly 221 bears against the normal bias given to reed 314 and thus forces the metal reed against contact 310 rather than remaining in its illustrated condition of bearing against contact 312. This condition defines an alternate leftward-shifted position of actuator rod assembly 208. The reed 314 is of conductive metal composition, a metal such as 0.02-inch silver plated spring phosphor bronze being preferable. The reed 314 is preferably received in jig assisted soldering or crimped retention in the output conductor of coaxial connector 316 and is further held in position by the preferably injection molded Delrin®, 400. The center pin of connector 316 is of the snap-in type and is arranged for present use to be soldered to separately and then snapped into place in order to protect the connector insulation from heat damage. The metal silver is one of several metals, generally noble metals, that may be used in electrically sensitive locations of the switch 114; other possible metal include gold, platinum and palladium. Where cost is a significant consideration other more conventional metals may be substituted when the performance compromises are acceptable.

A major portion of the actuator rod 208 is shown in greatest detail in the FIG. **4*c* drawing; from the FIG. 3 view of this assembly however, several additional details may be appreciated. These details include the use of a resilient "O" ring appearing in cross section at 334 to preclude entrance of moisture, dirt and other contaminants into the interior cavity of the switch 114. The "O" ring 334 resides in a circumferential groove of the actuator rod body portion 336 and in addition to this contaminants-exclusion role also serves in a capacity of providing desirable damping or frictional resistance against movement of the actuator rod body portion 336 and the inadvertent change of a selected switch position. As shown in FIG. 4*c* the actuator rod body portion 336 is also made with a detented groove 331 providing, in cooperation with the spring 306 and the stud or radius pin 332, the desired axial motion of the rod body portion in response to a rotation of the head 209 and the actuator rod body portion 336. This spring and pin detent arrangement also assist the desirable anti-bump characteristics for the switch of the present invention. Additional details regarding the general shape and extent of this detented groove 331 also appear in the FIG. 4***c* drawing herein; the detent recessions at each end of the groove appear particularly prominent in the FIG. 4*c* drawing.

Beveled flats 337 disposed on the interior side of the head 209 engage the combination rotational stop and physical protection element 214 to maintain the selected switch position in the event of an inadvertent bumping or axial displacement of the actuator rod body portion 336. Tapped small holes appear at 318, 320, 322 and 324 in the FIG. 3 drawing; these holes receive set screws preferably of the headless Allen wrench-driven type in order to hold prefabricated sub assemblies in position within the FIG. 3 switch housing 301.

FIG. 4 in the drawings shows four detail views of switch 114 components and assemblies identified in the FIG. 3 drawing. In FIG. 4*a* for example there is shown an isolated and detailed view of the assembled reed 314 and coaxial cable connector 316. Especially notable in the FIG. 4*a* drawing is the bent condition of the reed 314 in a free standing condition. This condition is achieved by an intentional permanent bending of the reed 314 following its attaching to the BNC coaxial center connector of assembly 316. Also shown in FIG. 4*a* is the groove or keyway 402 which positively locates the Delrin® molded reed assembly with respect to the switch 114 housing by way of the setscrew at 320. Metal portions of the coaxial connector 316 appear at 404 and 406 in FIG. 4*a* and are integral with connector locating flange 408. Fabrication of the FIG. 4*a* assembly, including accomplishment of the injection molding operation, may be performed by numerous electronic assembly houses including, for example, Vital Connections Incorporated of Tipp City, Ohio, 45371.

Figure 4B:
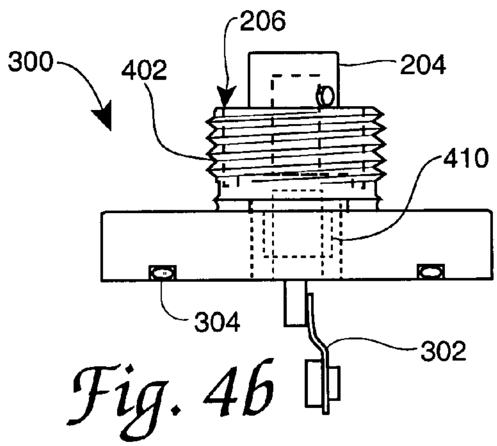
FIG. 4*b* shows an isolated detail view of a second sub-assembly used in the present invention.
Figure 4C:
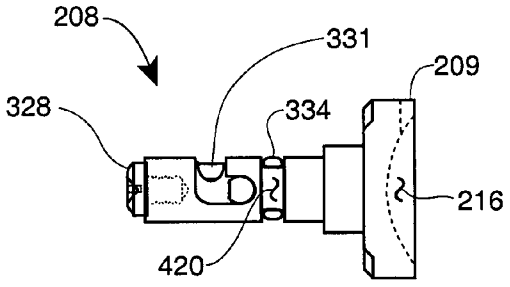
FIG. 4*c* shows an isolated detail view of a third sub-assembly used in the present invention.

FIG. 4*b* in the drawings shows a detailed and isolated view of the FIG. 3 cap contact 302 and the attending cap assembly 300. The metal electrical parts shown in the FIG. 4*b* drawing are preferably assembled with the aid of silver bearing soldering accomplished in an appropriate fabrication jig. The threads 402 appearing on receptacle 206 in the FIG. 4*b* drawing are preferably of the male 0.750–16 or ¾–16 UNF-2A type; mating female threads also compatible with the coaxial cable connector used at the antenna port of the PRC 117 series radio set are used at 315 (in FIG. 3) at the input port of the switch 114. These mating thread types of course promote the physical vertical stacking of several switches 114 if needed during operation of the PRC 117 series or other used radio sets. Similar threads may be provided at the surrounding receptacle 218 of the second output signal connector if desired for horizontal coupling of switches 114. The internal ¾–16 threads at 321 may be fabricated as an insert assembly that is held captive by the set screw at 318. Stacking is of course not necessary for use of the present invention switch since flexible coaxial conductors and their connectors may be employed at each of the three switch ports if desired.

FIG. 4*c* in the drawings shows an isolated, and more detailed view of the actuator rod assembly 208 appearing in the FIG. 1 through FIG. 3 drawings. Especially notable in the FIG. 4*c* view are the 4–40 UNC-2B threaded nylon screw 328 and the detent groove 331 discussed in connection with the FIG. 3 drawing. The detent groove may be seen to include both circumferential and axial path portions in which the detent pin 332 travels. The actuator rod assembly 208 including the "O" ring 334 is preferably lubricated with a material such as Tetra Grease, available from FTI Incorporated of Florham Park, N.J., prior to assembly in the switch body 301. The above-described thumb recess 216 in the head 209 is also visible in the FIG. 4*c* drawing.

Figure 4D:
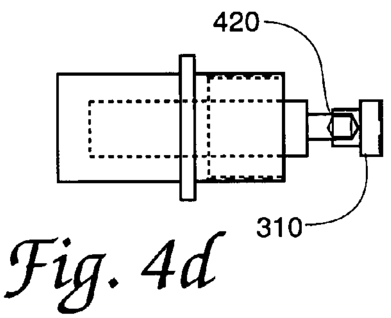
FIG. 4*d* shows an isolated detail view of a fourth sub-assembly used in the present invention.

FIG. 4*d* in the drawings shows an isolated and detailed view of one coaxial connector assembly, the connector assembly 308 appearing in FIG. 3. The soldered silver contact 310 shown in the FIG. 4*d* drawing is available commercially from sources such as Derringer Manufacturing Company located in Mundelein, Ill. Soldering of the contact 310 at the junction 420, notwithstanding the presence of thermoplastic insulation in the coaxial connector, is possible by way of the temperature tolerant insulation used in this connector.

Figure 5:
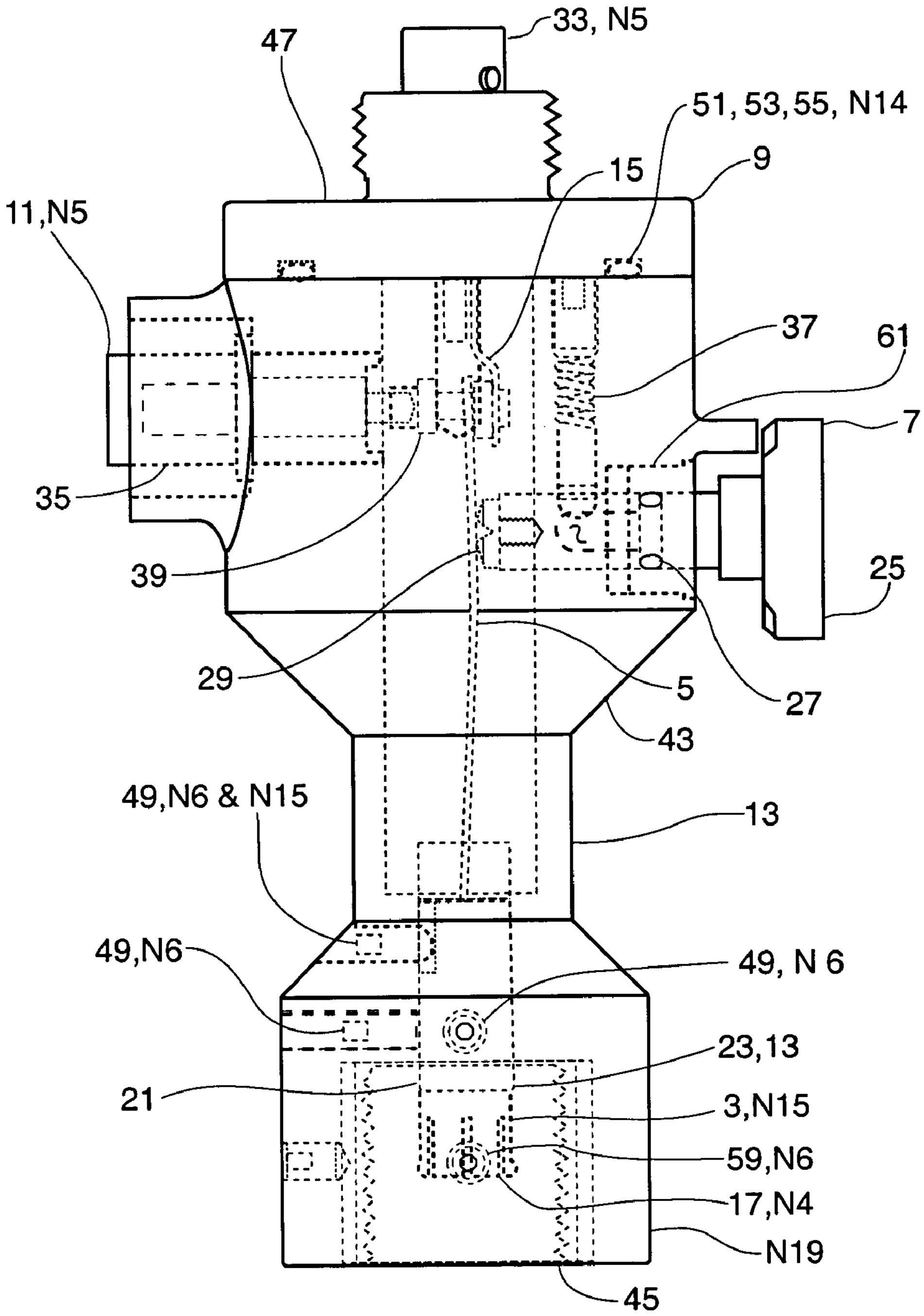
FIG. 5 shows parts of the invention keyed to data appearing in Table 1 and Table 2 herein.

FIG. 5 in the drawings shows a drawing similar to FIG. 3 in which internal parts of the invention are additionally identified by keying to a series of one and two digit numbers appearing below in Table 1 herein. The FIG. 5 and Table 1 parts are particularly identified as to procurement source and formal nomenclature names. The dashed numbers appearing in the table headings at the left in Table 1 represent assemblies.

TABLE 1

| −15 | −13 | −11 | −9 | −7 | −5 | −3 | −1 | RefDes | Nomenclature or Description | Part or Identifying No. | Specification/Vendor |
|---|---|---|---|---|---|---|---|---|---|---|---|
| | | | | | | | A/R | | Tetra Grease Lubricant | 10-1206-0000 | GC Electronics |
| | A/R | | | | | | | 19 | Loctite 680 Retaining Compound | 22477 | Loctite Corp. |
| | A/R | | | | | | | 19 | Loctite 7471 Ptimer T | 22477 | Loctite Corp. |
| | | | | | | | A/R | | Silicone Stripper | 80647 | Permatex |
| | | | | | | | A/R | 18 | Ultra Black RTV | 82180 | Permatex |
| | | | | | | | A/R | 6 | Loctite 222MS Threadlocker | 22231 | Loctite Corp. |
| | | | A/R | | | | A/R | 5 | Loctite 242 Threadlocker | 24231 | Loctite Corp. |
| | | A/R | A/R | | A/R | A/R | | | 2% Silver Eutectic Solder (Flux Cored) | 21-1795 | MCM Electronics |
| | 1 | | | | | | | 16 | Bushing | −61 | 303SS (.50 DIS × .62 Long) AMS5640 Type 1, QQ-S-764 Cond. A |
| | 2 | | | | | | | 90251A143 | 6-32 Unc Self Locking Cup Pt Socket Set Screw | −59 | McMaster-Carr |

TABLE 1-continued

| −15 | −13 | −11 | −9 | −7 | −5 | −3 | −1 | RefDes | Nomenclature or Description | Part or Identifying No. | Specification/Vendor |
|---|---|---|---|---|---|---|---|---|---|---|---|
| | | | 1 | | | | | 9452K74 | AS568A-020 BUNA-N O-RING | −57 | McMaster-Carr |
| | | | | | | | 1 | .125 DIA Drill Rod Mtrl D2 Tool Stl | 12 Detent | −55 | Crucible Service Centers |
| | | | | | | | 1 | 9435K12 | 302SS Spring 306 120D, .020 Wire DIA, 50. Long | −53 | McMaster-Carr |
| | | | | | | | 1 | 94355A190 | 8-32 UNC Flat Pt Socket Set Screw | −51 | McMaster-Carr |
| | | | | | | | 3 | 90251A144 | 6-32 UNC Self Locking Cup Pt Socket Set Screw | −49 | McMaster-Carr |
| | | | | | | | 2 | 92200A194 | 8-32 UNC Socket Head Cap Screw | −47 | McMaster-Carr |
| | 1 | | | | | | | 16 | Insert | −45 | 303SS (.87 Dia × .75 Long) AMS5640 Type 1, QQ-S-764 Cond. A |
| | 1 | | | | | | | 17 | Adapter, Body | −43 | 6061-T6511 (2.50 Dia × 3.50 Long) AMS-QQ-A-200/8 |
| 1 | | | | | | | | 8 | Reed, Upper | −41 | Spring Phosphor Bronze .020 THK (.25 × .56 Long) UNS-C5100 |
| 1 | | | | | | | | 10-3876 | Silver Contact | −39 | Deringer |
| | | 1 | | | | | | 10-3876 10 | Silver Contact | −37 | Deringer |
| | | 1 | | | | | | 32-221-RFX 11 | BNC 50 OHM Bulkhead Receptacle | −35 | Amphenol |
| | | | 1 | | | | | 31-221-RFX | BNC 50 OHM Bulkhead Receptacle | −33 | Amphenol |
| | | | 1 | | | | | 16 | Adapter, Cap | −31 | 303SS (1.68 Dia × .75 Long) AMS5640 Tupe 1, QQ-S-764 Cond. A |
| | | | | 1 | | | | 91766A105 9 | 4-40 UNC Nylon 6/6 Pan Head Phillips Screw | −29 | McMaster-Carr |
| | | | | 1 | | | | 9452K15 | AS568A-007 BUNA-N O-RING | −27 | McMaster-Carr |
| | | | | 1 | | | | 16 | Actuator Rod | −25 | 303SS (.87 Dia × 1.12 Long) AMS5640 Type 1, QQ-S-764 Cond. A |
| | | | | | | 1 | | 1305-008-058 4 | BNC Plug Body | −23 | Cambridge Products Corp. |
| | | | | | | 1 | | McMaster-Carr 8682K13 | Holder, Reed | −21 | Nylon 6/12 (.38/dia × .62 Long) ASTM D4066 PA613 |
| | | | | | 1 | | | 8 | Reed | −19 | Spring Phosphor Bronze .020 THK (.25 × 2.06 Long) UNS-C51000 |
| | | | | | 1 | | | | Reed Wire | −17 | .035 Dia Copper Wire (19 GA) (RG-58 Coax Core Wire) |
| – | | | 1 | | | | | | Upper Reed Assembly | −15 | |
| | – | | | | | | 1 | | Body Assembly | −13 | |
| | | – | | | | | 1 | | Side BNC/Contact Assembly | −11 | |
| | | | – | | | | 1 | | Cap Assembly | −9 | |
| | | | | – | | | 1 | | Actuator Rod Assembly | −7 | |
| | | | | | – | 1 | | | Reed Assembly | −5 | |
| | | | | | | – | 1 | | Reed Holder Assembly | −3 | |
| | | | | | | | | | Assembly | −1 | |

Table 2 appearing below herein recites a plurality of general notes relating to the fabrication and assembly of a switch according to the present invention. References to these Table 2 notes appear in the FIG. 5 drawing as "N6" and so-on. Certain of the notes following, such as N1, appear to be superfluous and unnecessary in the present patent document setting; These notes first appear in but appear in a source drawing intended for fabrication and other non-patent uses.

TABLE 2

1 This drawing was produced by computer graphics - not to be manually changed.

2 All Fillet Radii .020 unless noted.

3 Mark part as shown, boss or relief permitted. Text height .25 inches, .015 inches deep.

TABLE 2-continued

| | |
|---|---|
| 4 | Remove BNC plug body from Cambridge BNC plug part no. CPMC-88-1 if unavailable as stock item. Retain insulator #1305-024-00 and contact #1305-0190503. Modify as shown. |
| 5 | Apply Locktite 242 to threads prior to assembly. |
| 6 | Apply Locktite 222MS to threads prior to assembly. |
| 7 | Assemble cap assembly to body assembly with screws torque to 9 In-lbs. |
| 8 | Silver plated .0005 thk per QQ-S-365 source; electro polish form and machine after silver plating. |
| 9 | Modify as shown. |
| 10 | Modify as shown. |
| 11 | Modify as shown. |
| 12 | Modify as shown. Finish black oxide per mil-C-13924, Class I. |
| 13 | Test fit assembly to insure contact snaps into BNC plug body insulator. |
| 14 | Adjust set screw flush with top of adapter body. |
| 15 | Align flat on reed holder toward set screw hole. Press fit reed holder assembly into body assembly. |
| 16 | Finish blast exterior surface to matte finish if noted. Prior to blasting mask areas as noted. Finish black oxide entire part per MIL-C-13924, Class IV (Stainless Steel). Certification required. Source; Electro Polish. |
| 17 | Finish blast exterior surface to matte finish as noted. All dimensions apply before anodizing. Finish black anodize .001 penetration/.001 surface thickness, per MIL-A-8625, Type III (Hard), Class II (Black Matte Finish). Apply after text engraving. Do not anodize or blast holes. .4370–.4374 Dia C-bore, .500 Dia C-bore, or >8503 Dia C-bore of adapter body. |
| 18 | Apply ultra black RTV to all exposed screw heads after assembly and testing. |
| 19 | Apply primer "T" to mating diametrical surfaces and allow to dry. Apply Loctite 680 (Retaining Compound) to mating surfaces before assembly. |
| 20 | Apply Tetra Grease to O-rings and actuator rod assembly as shown. |

A dull black finish is preferred for the switch 114, this may be accomplished in the form of anodizing for the preferably cast or machined Aluminum body portion 301 of the switch 114 and as Black Oxide for the preferably stainless steel cap assembly 300. The BNC coaxial connectors used in the switch 114 may be referred to as "male" and "female" connectors even though for example the male connector in such UHF-capable connectors includes a male portion that is surrounded by a larger physically securing and electrically conductive female portion.

Preferably the switch 114 is arranged for the LOS antenna (i.e., the monopole antenna) 106 in FIG. 1 to screw onto the top port of the switch and for the SATCOM (i.e., multi element plus back plane reflector) antenna to connect to the side port via a coaxial cable. Switching between these two ports is facilitated by the push/pull (P/P) switching action of the actuator rod assembly 208 protruding from one side the side of the switch. In the normal position, the actuator rod assembly 208 is pulled out and does not touch the reed 314. The reed is spring-loaded and naturally closes an electrical circuit with the (top) LOS antenna port. This is preferred because the LOS antenna is the most commonly used in our application of the invention. To select the (side) SATCOM antenna port, the P/P switch is turned 90 degrees clockwise and pushed in. The P/P switch, with the non-conductive insulated tip, pushes the reed away from the (top) LOS output port, opening the circuit with the LOS antenna. The reed then presses firmly against the (side) SATCOM output port contact, closing the circuit between the radio and the SATCOM antenna. The P/P switch maintains its position through the use of the spring-loaded detent pin that rides in the channel milled into the P/P switch actuator. Detent recesses are milled at each end of the channel to keep the switch securely in position.

The present invention switch reduces the risk of friendly-fire accidents in its special operations forces use by its quick change and minimal off-air capabilities and thereby offers significant potential to in-fact save lives. With on the order of 15,000 PRC 117 and similar radios currently in the DoD inventory considerable usage of the invention is possible. Since the acquisition cost of the PRC 117 tactical radio is in the range of $39,000 use of the present invention may also be viewed as a cost savings activity and an elimination of one part of any need to replace the PRC 117 radios. The present invention switch thus solves a very real and life-threatening problem with employment of the PRC 117 family of tactical radios, and eliminates the need to acquire new tactical radios or to modify the current inventory.

Use of the present invention switch inclusive communication is of course not limited to the exemplary situations represented in FIG. 1 herein, the switch 114 may be used for example to switch between two antennas of the same type that are directed differently or between two antennas of the same general type that are configured for different signal gain characteristics. With stacking of a plurality of switches 114 it is also possible to couple three or more different antennas to a given radio apparatus or conversely to couple several different radio sets to a given antenna on a time shared, switched basis. Two antennas of course need one switch and three antennas need two switches and so on when coupled to a single radio.

While the apparatus and method herein described constitute a preferred embodiment of the invention, it is to be understood that the invention is not limited to this precise form of apparatus or method and that changes may be made therein without departing from the scope of the invention, which is defined in the appended claims.

We claim:

1. Ruggedized, manually operated, physically stackable, radio set mountable, A/B antenna switch apparatus comprising the combination of:

a fist-sized metallic housing having a hollow interior portion, a housing lengthwise axis-disposed first housing wall-traversing male coaxial connection signal port, a housing lengthwise axis-disposed second housing wall-traversing female coaxial connection signal port, a housing radial axis-disposed third housing wall-traversing female coaxial signal port and a housing radial axis-disposed, detented, housing wall-traversing rotatable switch actuation member having accidental switching protection;

a plurality of electrical switch contact structures located within said fist-sized metallic housing hollow interior portion and each received in physical and electrical connection with one of said housing-traversing coaxial connections, said electrical switch contact structures including one cantilevered contact structure movable into elective pressured electrical connection with either of two remainder of said electrical switch contact structures in response to a manually sourced combination of rotational and axial movement of said housing radial axis-disposed housing wall-traversing rotatable switch actuation member;

each of said housing lengthwise axis-disposed first housing wall-traversing male coaxial connection signal port and said housing lengthwise axis-disposed second housing wall-traversing female coaxial connection signal port being coaxially received in recess within a surrounding housing threaded receptacle portion located at opposed lengthwise axis ends of said housing; and one of said lengthwise axis-disposed surrounding housing threaded receptacle portions being inclusive of externally disposed male threads and one of said lengthwise axis-disposed surrounding housing threaded receptacle portions being inclusive of internally disposed female threads of mating thread compatibility with said externally disposed male threads;

said mating thread compatibility enabling lengthwise axis physical and electrically interconnected stacking of a plurality of said A/B antenna switch apparatus.

2. The ruggedized, manually operated, physically stackable, radio set mountable, A/B antenna switch apparatus of claim 1 wherein said switch apparatus is receivable on an antenna connection port connector of a PRC 117 series military radio transceiver apparatus.

3. The ruggedized, manually operated, physically stackable, radio set mountable, A/B antenna switch apparatus of claim 2 wherein said lengthwise axis-disposed surrounding housing threaded receptacle portion inclusive of externally disposed male threads surrounds a female coaxial connection and said lengthwise axis-disposed surrounding housing threaded receptacle portion inclusive of internally disposed female threads surrounds a male coaxial connection and said threaded receptacle portions and said surrounded coaxial connections cooperate to enable said lengthwise axis physical and electrically interconnected stacking of a plurality of said A/B antenna switch apparatus.

4. The ruggedized, manually operated, physically stackable, radio set mountable, A/B antenna switch apparatus of claim 3 wherein said male and said female coaxial connections are bulkhead mountable commercial BNC connectors.

5. The ruggedized, manually operated, physically stackable, radio set mountable, A/B antenna switch apparatus of claim 4 further including a plurality of flexible coaxial cable tether members having interconnection compatibility with said commercial BNC connectors in said A/B antenna switch apparatus threaded receptacle portions and selectably interconnecting said radio transceiver with said A/B antenna switch apparatus and with remotely located antenna members.

6. The ruggedized, manually operated, physically stackable, radio set mountable, A/B antenna switch apparatus of claim 3 wherein said a fist-sized metallic housing is comprised of one of cast aluminum and machined aluminum materials and includes a plurality of o-ring seals disposed adjacent housing apertures.

7. The ruggedized, manually operated, physically stackable, radio set mountable, A/B antenna switch apparatus of claim 3 wherein said rotatable switch actuation member includes a metal body portion having a detent receptacle portion and an electrically insulated tip portion engageable with said movable cantilevered contact member.

8. The ruggedized, manually operated, physically stackable, radio set mountable, A/B antenna switch apparatus of claim 7 wherein said rotatable switch actuation member includes a thumb-recessed rotation-control knob and wherein said rotatable switch actuation member accidental switching protection includes a housing protrusion member disposed in interfering cooperation with said thumb-recessed rotation-control knob.

9. The ruggedized, manually operated, physically stackable, radio set mountable, A/B antenna switch apparatus of claim 3 wherein said plurality of electrical switch contact structures located within said fist-sized metallic housing hollow interior portion each include a noble metal electrical contact element.

10. The ruggedized, manually operated, physically stackable, radio set mountable, A/B antenna switch apparatus of claim 3 wherein each of said housing wall-traversing male coaxial connection signal port, said housing lengthwise axis-disposed second housing wall-traversing female coaxial connection signal port, said housing radial axis-disposed third housing wall-traversing female coaxial signal port and said housing radial axis-disposed, detented, housing wall-traversing rotatable switch actuation member includes an o-ring member disposed in a housing opening-sealing relationship.

11. The ruggedized, manually operated, physically stackable, radio set mountable, A/B antenna switch apparatus of claim 3 wherein said apparatus includes a removable end closure portion receivable in hollow interior portion-closing, o-ring-sealed relationship with an endwise aperture of said housing hollow interior portion and including said lengthwise axis-disposed threaded receptacle portion male threads and female coaxial connection received thereon.

12. The ruggedized, manually operated, physically stackable, radio set mountable, A/B antenna switch apparatus of claim 3 wherein said cantilevered contact structure located within said fist-sized metallic housing hollow interior portion is connected with said first housing wall-traversing male coaxial connection signal port and is movable into elective pressured electrical connection with either of two fixed position remainder of said electrical switch contact structures connected with said a female coaxial connection.

13. The ruggedized, manually operated, physically stackable, radio set mountable, A/B antenna switch apparatus of claim 1 wherein said switch apparatus is receivable on an antenna connection port connector of a PCS 5 series military radio transceiver apparatus.

14. The battlefield conditions-adapted method of electively connecting a unitary input/output port of a wide-band portable radio transceiver apparatus with any of an N plurality of differently-configured antenna members, said method comprising the steps of:

communicating transmitting and received radio frequency energy with each said antenna member of said N plurality of differently configured antenna members via one of an N plurality of antenna-connected coaxial transmission line members;

selectably connecting each of said N plurality of coaxial transmission line members with said portable radio transceiver apparatus unitary input/output port by way of manually operated two-position electrical switch elements disposed externally of said portable radio transceiver apparatus and adjacent said unitary input/output port thereof;

said selectably connecting step including stacking an N−1 interconnected plurality of said manually operated two-position electrical switch elements externally of said portable radio transceiver apparatus, in connection with said unitary input/output port thereof, whenever N has a magnitude in excess of two and disposing one of said manually operated two-position electrical switch elements externally of said portable radio transceiver apparatus when N has a magnitude of two;

electing a subsequent in said stacking two-position electrical switch element radio frequency energy feedthrough position setting for each said two-position electrical switch element located intermediate said portable radio transceiver apparatus and an active antenna coaxial transmission line member in said stacked plurality of two-position electrical switch elements; and selecting a new pattern of two-position electrical switch element settings in response to each change of portable radio transceiver apparatus operating mode requiring a differently configured antenna member;

said stacking of N−1 interconnected plurality of manually operated two-position electrical switch elements together with said selecting step enabling rapidly changed antenna operation of said wide band portable radio transceiver apparatus absent coaxial transmission line member uncoupling and reconnection steps under said battlefield conditions and in darkness.

15. The battlefield conditions-adapted method of electively connecting a unitary input/output port of a wide-band portable radio transceiver apparatus with any of an N plurality of differently-configured antenna members of claim 14 wherein said step of stacking an N−1 interconnected plurality of said manually operated two-position electrical switch elements externally of said portable radio transceiver apparatus includes interconnecting a plurality of said manually operated two-position electrical switch elements by way of mating coaxial cable fittings held in mated condition by surrounding thread-engaged male and female threaded members.

16. The battlefield conditions-adapted method of electively connecting a unitary input/output port of a wide-band portable radio transceiver apparatus with any of an N plurality of differently-configured antenna members of claim 14 wherein said differently-configured antenna members comprise antenna members having at least one of a differing physical configuration, a differing electrical resonance frequency, a differing azimuth orientation, a differing elevation orientation, a differing gain characteristic, a differing terrain location and a differing electrical field strength pattern.

17. The battlefield conditions-adapted method of electively connecting a unitary input/output port of a wide-band portable radio transceiver apparatus with any of an N plurality of differently-configured antenna members of claim 14 wherein said differently-configured antenna members include a satellite communication-capable directive antenna and a monopole omni directional antenna.

18. The battlefield conditions-adapted method of electively connecting a unitary input/output port of a wide-band portable radio transceiver apparatus with any of an N plurality of differently-configured antenna members of claim 14 further including the step of mounting at least one of said two-position electrical switch elements disposed externally of said portable radio transceiver apparatus and adjacent said unitary input/output port thereof directly onto an antenna connector port of said military transceiver apparatus.

19. The battlefield conditions-adapted method of electively connecting a unitary input/output port of a wide-band portable radio transceiver apparatus with any of an N plurality of differently-configured antenna members of claim 14 wherein said step of electing a subsequent in said stacking two-position electrical switch element radio frequency energy feed-through position setting for each said two-position electrical switch element located intermediate said portable radio transceiver apparatus and an active antenna coaxial transmission line member in said stacked plurality of two-position electrical switch elements comprises selecting an axially straight through radio frequency energy coupling path in at least one of said stacked two-position electrical switch elements.

20. Military transceiver communications apparatus comprising the combination of:

a transceiver military radio-set;

an abuse immune, protective clothing compatible, physically stackable A/B antenna switch apparatus disposable on said transceiver military radio-set and comprising:

a table salt shaker-sized anodized aluminum switch housing having a hollow interior portion, a housing lengthwise axis-disposed first housing wall-traversing male fifty ohm characteristic impedance coaxial connection signal port, a housing lengthwise axis-disposed second housing wall-traversing female fifty ohm characteristic impedance coaxial connection signal port, a housing radial axis-disposed third housing wall-traversing female fifty ohm characteristic impedance coaxial signal port and a housing radial axis-disposed, housing wall-traversing, axially movable rotatable and detented metallic switch actuation member having an electrical insulating interior tip portion and a recessed and position-identifying-groove marked housing-external head portion additionally cooperating with an accidental switching prevention physical interference protrusion element disposed on said housing adjacent said switch actuation member housing wall traversing location;

a trio of electrical switch contact structures located within said table salt shaker-sized anodized aluminum housing hollow interior portion and each received in physical and electrical connection with one of said housing-traversing fifty ohm coaxial connections, said electrical switch contact structures including one cantilever spring-biased contact structure disposable into elective pressured electrical connection with either of two fixed-position remaining of said electrical switch contact structures in response to a manually sourced combination of rotational and axial movement of said housing radial axis-disposed housing wall-traversing rotatable and detented switch actuation member and cantilever spring-biased contact structure urging by said housing wall-traversing rotatable and detented switch actuation member electrical insulating interior tip portion;

each of said housing lengthwise axis-disposed first housing wall-traversing male fifty ohm characteristic impedance coaxial connection signal port and said housing lengthwise axis-disposed second housing wall-traversing female fifty ohm characteristic impedance coaxial connection signal port being coaxially received in recess within a surrounding housing ¾–16 threaded receptacle portion located at opposed lengthwise axis ends of said housing; and one of said lengthwise axis-disposed surrounding housing ¾–16 threaded receptacle portions being inclusive of externally disposed male threads and one of said lengthwise axis-disposed surrounding housing threaded receptacle portions being inclusive of internally disposed female threads of mating ¾–16 thread compatibility with said externally disposed male threads and with male ¾–16 threads of an output connector of said transceiver military radio-set;

said mating thread compatibility enabling lengthwise axis physical and electrically interconnected stacking of a plurality of said abuse-immune, manually operated, physically stackable, transceiver military radio-set mountable, A/B antenna switch apparatus devices and manual selection in each said stacked A/B antenna switch, during darkness and battlefield conditions, of one of radio frequency energy feed through and radio frequency energy exchange with a selected one of a plurality of radio frequency antennas coupled by coaxial cables and said stack of said A/B antenna switches to said transceiver radio-set.

21. The military transceiver communications apparatus of claim 20 wherein said transceiver radio-set consists of one of a PRC 117F high frequency to ultra high frequency military transceiver radio set.

22. The military transceiver communications apparatus of claim 20 wherein said abuse immune, protective clothing compatible, physically stackable A/B antenna switch apparatus housing radial axis-disposed, housing wall-traversing, axially movable rotatable and detented metallic switch actuation member having an electrical insulating interior tip portion and a recessed and position-identifying-groove marked housing-external head portion includes a thumb recessed dimple head portion capable of manipulation by one of a weather protected and a chemical warfare agent protected gloved human hand.

23. Military special operations forces portable voice communications apparatus comprising the combination of:

a portable battery operated special operations forces radio frequency-tunable high frequency and ultra high frequency voice communications radio transceiver having a single antenna electrical energy communications port coaxial fitting;

a monopole first radio antenna member having a substantially uniform circular electromagnetic field pattern, local geographic area ground to ground and ground to air communications capability and a coaxial electrical energy communication port;

a multi-element plus back plane reflector second radio antenna member having a major lobe unidirectional electromagnetic field pattern, ground to orbiting satellite communications capability and a coaxial cable electrical energy communicating second tether member; and a manually operable, environmentally sealed, metal housing enclosed, coaxial single pole double throw electrical switch member physically receivable on said radio transceiver single antenna electrical energy communications port coaxial fitting and having a special operations forces personnel gloved hand compatible, detented, push pull switch position-changing manual input, said electrical switch member having first and second electrical energy communicating coaxial ports connectable with said first radio antenna member and said second radio antenna member respectively;

said electrical switch connection with said first radio antenna member being by way of a selectable one of a direct engagement between said first antenna member coaxial electrical energy communication port with said electrical switch first electrical energy communicating port and a coaxial cable electrical energy communication first tether member coupling of said first antenna member coaxial electrical energy communication port with said electrical switch first electrical energy communicating port;

said electrical switch connection with said second radio antenna member being by way of said coaxial cable electrical energy communication second tether member coupling of said second antenna member coaxial electrical energy communication port with said electrical switch second electrical energy communicating port; and said manually operable, environmentally sealed, metal housing enclosed, coaxial single pole double throw electrical switch member enabling rapid, minimal transceiver communications interrupted, first antenna and second antenna transition-inclusive communications between said special operations forces personnel and both local and orbiting satellite-accessed distant personnel.

24. The military special operations forces portable voice communications apparatus of claim 23 further including a third coaxial cable tether member connected between said radio transceiver single antenna electrical energy communications port coaxial fitting and an electrical switch member coaxial port common between said first and second electrical energy communicating coaxial ports.

* * * * *